Jan. 27, 1970  B. F. GILES  3,491,848
WAVE GENERATOR ARRAYS FOR MARINE SEISMIC EXPLORATION
Filed Jan. 10, 1968  3 Sheets-Sheet 1

INVENTOR
BEN F. GILES
ATTORNEY

INVENTOR
BEN F. GILES
ATTORNEY

Jan. 27, 1970 B. F. GILES 3,491,848
WAVE GENERATOR ARRAYS FOR MARINE SEISMIC EXPLORATION
Filed Jan. 10, 1968 3 Sheets-Sheet 3

INVENTOR:
BEN F. GILES
Jerry W. Mills
ATTORNEY

United States Patent Office 3,491,848
Patented Jan. 27, 1970

3,491,848
WAVE GENERATOR ARRAYS FOR MARINE SEISMIC EXPLORATION
Ben F. Giles, Dallas, Tex., assignor to Texas Instruments Incorporated, Dallas, Tex., a corporation of Delaware
Filed Jan. 10, 1968, Ser. No. 696,861
Int. Cl. G01v 1/38
U.S. Cl. 181—0.5                    17 Claims

ABSTRACT OF THE DISCLOSURE

Seismic wave sources are streamed behind a marine vessel in a horizontal array such that horizontally traveling components of the generated seismic wave trains will be out of phase with one another when received by hydrophones streamed behind the marine vessel. The seismic wave sources are also streamed at depths proportional to the fundamental frequency of the generated seismic waves and are fired at different times such that vertically traveling components of the generated wave trains interact with one another in accordance with desired operating conditions.

---

This invention relates to marine seismic exploration, and more particularly to marine seismic exploration wherein horizontally traveling components of the generated seismic wave trains are canceled and vertically traveling components of the wave trains are selectively enhanced or compacted.

A common problem in marine seismic exploration is the reception of horizontally traveling noise by the hydrophone streamers trailed behind the marine exploration vessel. Additionally, in the exploration of areas where the objective is mapping relatively thick seismic beds, problems sometimes arise in obtaining an adequate signal-to-noise ratio with seismic wave sources, due to insufficient energy generated by the sources. Alternatively, in the exploration of areas where it is desired to map relatively thin seismic beds, seismic wave sources often generate seismic waves of excessive length which tend to obscure the recording of meaningful seismic data.

In land based seismic exploration, it has been heretofore known to dispose dynamite charges in geometric arrays on the surface of the earth in order that certain components of the generated seismic waves will be canceled. It has also been known in land based seismic exploration to dispose dynamite charges at depths in the earth in order to enhance downwardly traveling components of the generated seismic waves. However, it has not been possible for marine seismic exploration systems to practically utilize such arrays of dynamite charges to accomplish these results due to the obvious economic and operational problems in maintaining the position of the dynamite charges, in addition to safety hazards inherent in the detonation of such charges. Although marine seismic exploration systems have heretofore streamed more than one nondynamite source behind marine exploration vessels in order to compensate for the low power of a single source, none of the above enumerated problems have been heretofore adequately solved by a practical marine system.

In accordance with the present invention, an array of seismic wave sources are streamed behind a seismic exploration vessel. The sources are spaced apart in both horizontal and vertical planes in order that horizontal components of the generated seismic wave trains are canceled, in addition to providing selected interaction between the downwardly traveling components of the generated seismic wave trains.

For a more complete understanding of the present invention and for further objects and advantages thereof, reference may now be had to the following description taken in conjunction with the accompanying drawings, in which.

Figure 1:
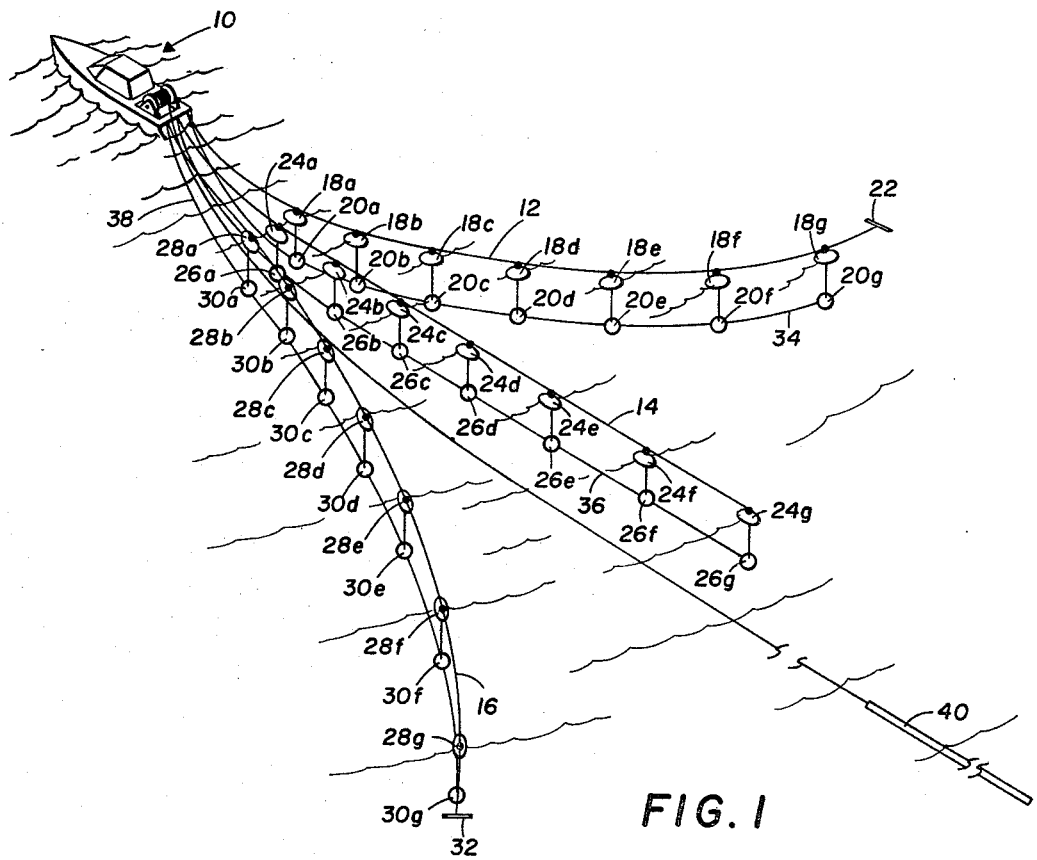
FIGURE 1 is a diagrammatic perspective view of one embodiment of a horizontal source array according to the present invention.

Referring to FIGURE 1, a marine exploration system is illustrated wherein a vessel 10 traverses a seismic exploration path while streaming three cables 12, 14 and 16. A plurality of float members 18a–18g are connected at spaced intervals to the cable 12, each of the floats supporting one of the seismic wave sources 20a–20g at a predetermined depth by a suitable cable linkage. The position of the cable 12 is maintained behind the vessel 10 at an angle to the line of traverse of the vessel by a paravane 22 connected to the end of the cable. This paravane 22 may be any suitable vane device which maintains the position of the cable 12 due to the force of the water against the angled vane.

Similarly, float members 24a–24g are spaced along the cable 14 and support by suitable cable linkages seismic wave sources 26a–26g. Cable 14 is streamed directly behind the vessel 10 along the line of traverse. Cable 16 includes float members 28a–28g which support seismic wave sources 30a–30g from cable linkages. A paravane 32 maintains the cable 16 taut and at an angle to the line of traverse of the vessel 10 on the side opposite the cable 12. In this embodiment, the wave sources are maintained at generally the same depth, which may be for instance twenty-five feet. However, it has been found advantageous in many instances to provide seismic wave sources which generate seismic wavetrains having differing fundamental frequencies. In this instance, the wave sources may be streamed at different depths in the manner later described, although they may also be streamed at a common depth. The use of sources having different frequencies creates wavetrains which cover a relatively wide frequency band and provide excellent seismic data.

The seismic wave sources may comprise any one of a number of suitable sources presently available. For instance, the sources may comprise chambers from which predetermined amounts of pressurized gas are intermittently released to form gas bubbles which form underwater pressure waves. Alternatively, the sources may comprise chambers in which gas is supplied and ignited by an electric spark to create underwater pressure waves. With the utilization of either of these types of seismic wave sources, gas and electric actuating signals are supplied to the sources through lines 34, 36 and 38, respectively.

A hydrophone streamer 40 is streamed from the vessel 10 along the line of traverse at a distance behind the seismic wave sources in order to receive seismic reflections from the ocean substrata. Streamer 40 is towed at a predetermined depth, which may be for instance fifty feet, from a lead-in extending from the vessel 10. An important aspect of the present invention requires that the seismic wave sources be disposed within an area such that direct reflections from the ocean bottom received by the hydrophone 40 appear to emanate from a point source. To achieve such a result, the seismic wave sources illustrated in FIGURES 1 and 2 may have a length up to approximately six hundred feet, while the hydrophone streamer 40 is maintained several hundred feet behind the sources and has a length of up to about seven thousand two hundred feet. The number of sources used, and the spacing between the sources, will be varied in accordance with the characteristics of the area being surveyed.

Generally, only vertically traveling direct reflections are desirably received by the hydrophones in the streamer 40 to provide data concerning the bottom surface of interest. Horizontally traveling waves which are reflected from underwater obstructions and the like are generally not of interest, and only tend to obscure the meaningful vertically traveling waves. From an inspection of FIGURES 1 and 2, it will be seen that the invention provides an array of seismic wave sources spaced parallel and laterally spaced from the line of traverse. This array of sources provides considerable cancellation of horizontally traveling waves in all directions, and is not limited to cancellation of waves traveling generally parallel to the line of traverse, as would be a linear array of seismic wave sources.

Figure 2:
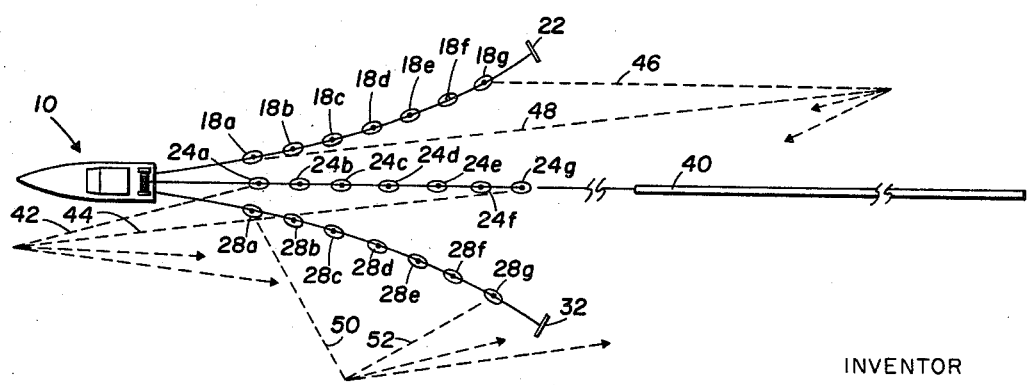
FIGURE 2 is a top diagrammatic view of the embodiment shown in FIGURE 1.

FIGURE 2 illustrates examples of cancellation of certain horizontally traveling waves with the invention. For instance, the seismic wavetrain component generated by the source 26a (float 24a) and traveling generally along the horizontal path 42 is out of phase at any instant at a common location with the horizontally traveling wavetrain component from the source 26g (float 24g) which travels generally along the line 44, due to the horizontal spacing between the sources 26a and 26g. Consequently, at least a portion of the frequencies contained in the wavetrains traveling along the two paths 42 and 44 will be out of phase with one another when received by hydrophones in the streamer 40, and therefore will tend to cancel one another. Similar cancellation will be effected by waves traveling along paths 46 and 48 and reflected from an obstruction rearward of the vessel 10. It will be understood that similar cancellation is provided by the remainder of the spaced sources in these instances. Although not all frequencies will be cancelled due to a selected spacing between sources, the spacing for each application will be selected to cancel those frequencies in the band of greatest seismic interest.

Additionally, horizontally traveling waves reflected from an obstacle broadside of the array will also be substantially cancelled. For instance, horizontal components of wavetrains traveling along paths 50 and 52 will be out of phase at any instant at a common location due to the spacing between sources 28a and 28g. Consequently, the reflected wavetrain components will reach the hydrophones in the streamer 40 out of phase with one another and substantial cancellation will be provided.

It is to be understood that a number of different geometrical configurations may be used in the practice of the present invention, as long as the sources are confined to an area such that the downwardly traveling components of the waves appear to emanate from a point source and a proper horizontal spacing of the sources is maintained. The magnitude of the spacing between the sources will, of course, depend upon the particular frequencies in which maximum cancellation is desired.

Figure 3:
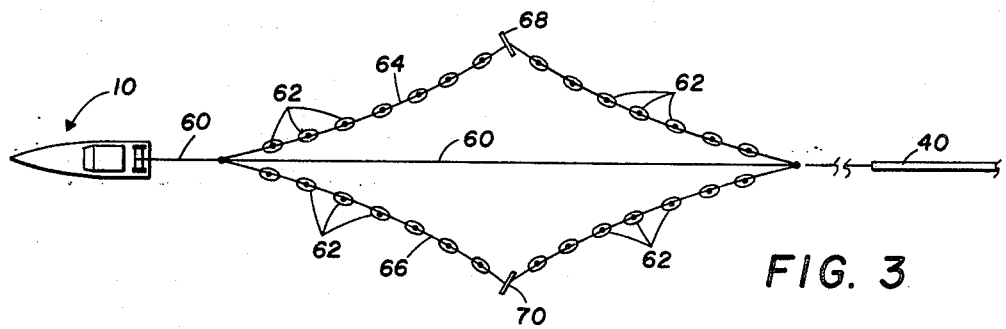
FIGURES 3–6 are illustrations of other embodiments of horizontal arrays according to the invention.

FIGURE 3 illustrates a system wherein a plurality of sources are maintained in a substantially diamond-shaped configuration. The sources are towed behind the vessel 10 by a cable 60 and are suspended from a plurality of floats 62 in the manner previously described. Floats 62 are spaced along a pair of flexible cables 64 and 66 which are connected at each end to cable 60 and maintained in the illustrated positions during towing by paravanes 68 and 70 connected midway along the cables.

From an inspection of FIGURE 3, it will be seen that the seismic wave sources are spaced with respect to one another in a horizontal plane both parallel and perpendicular to the vessel traverse. This spacing enables cancellation of horizontally traveling waves in all directions about the array. The use of the flexible cable lines 60, 64 and 66 enables the array to be pulled in and stored on the vessel when not in use.

Figure 4:
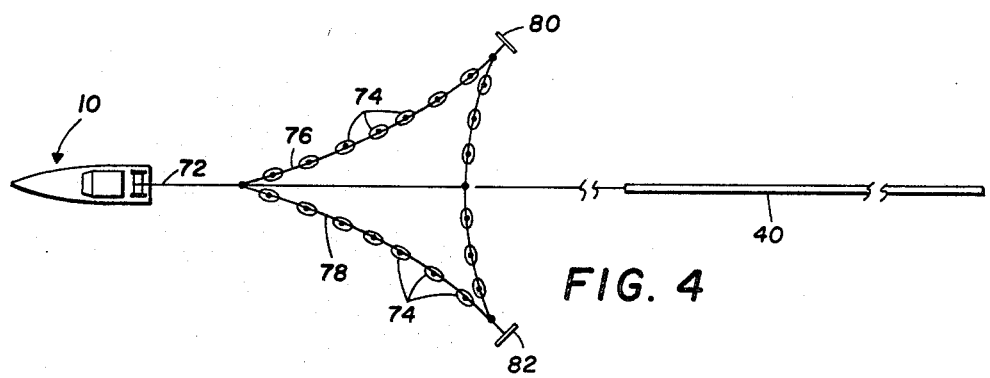

FIGURE 4 illustrates a triangular array constructed in a somewhat similar manner as the array shown in FIGURE 3. Vessel 10 streams a cable 72 connected to the array of sources supported by floats 74. The floats are spaced along cable lengths 76 and 78 which are attached to cable 72 at each end. Paravanes 80 and 82 maintain the cables 76 and 78 in the substantially triangular configuration during the towing thereof. This configuration also provides a source array having wave sources spaced both parallel and perpendicular to the line of traverse of the vessel 10, thus affording substantial cancellation of horizontally traveling waves in all directions.

Figure 5:
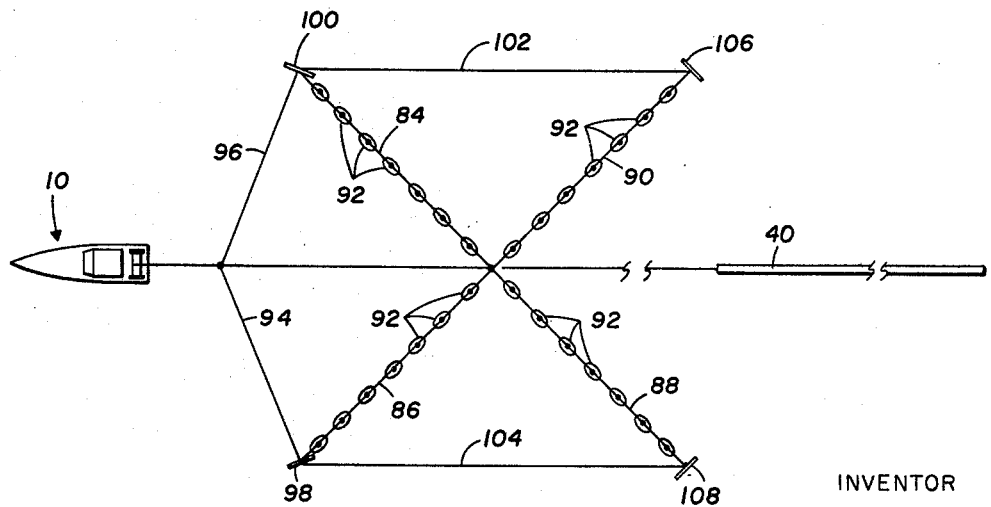

FIGURE 5 illustrates a star-shaped source configuration towed by vessel 10, and including four cable legs 84, 86, 88 and 90 each having floats 92 which support seismic wave sources similar to those previously described. Lines 94 and 96, in combination with the forces exerted by paravanes 98 and 100, maintain the cable legs 84 and 86 in the illustrated position during towing. Cable lengths 102 and 104, in combination with the paravanes 106 and 108, maintain the legs 88 and 90 in the proper position during towing. Again, due to the flexible nature of the connecting lines for the seismic sources, the entire array may be hauled in and stored on the vessel 10 when not being towed.

Figure 6:
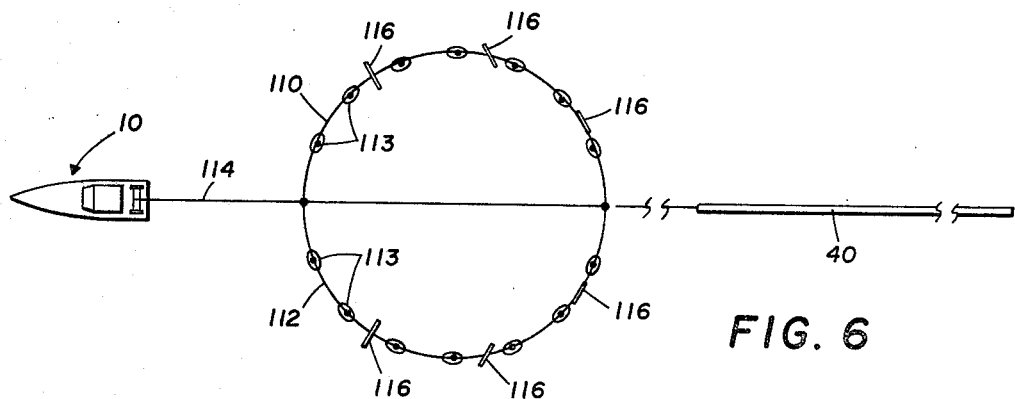

FIGURE 6 illustrates an idealized application of the invention wherein a generally circular source array is towed behind the vessel 10. To obtain a perfect circular array, a substantially rigid framework may be required. However, a generally circular configuration may be obtained by the use of flexible lines 110 and 112, which support floats 113 and are connected at both ends to cable 114. A plurality of properly spaced and angled paravanes 116 are connected to the lines 110 and 112. Good results may also be obtained with the use of a second concentrically disposed circle of seismic sources in order to obtain maximum cancellation of horizontally traveling waves in all directions.

Figure 7:
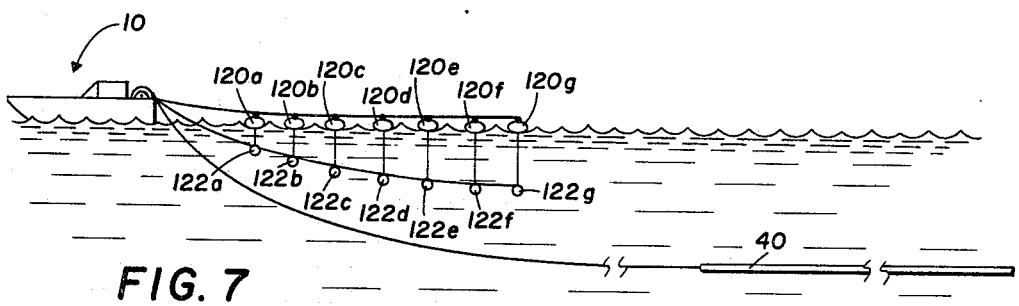
FIGURE 7 is a diagrammatic side view of an embodiment utilizing wave sources disposed at different depths according to the invention.

When sources of different frequencies are utilized with the invention, it is advantageous in many respects to tow the sources at different depths underwater. FIGURE 7 illustrates an embodiment wherein floats 120a–120g support wave sources 122a–122g at different depths in the water determined by the fundamental frequency of the wave produced by the sources. It will be understood that FIGURE 7 illustrates only one plane of a source array which may have the configuration of any of those arrays previously described.

Figure 8:
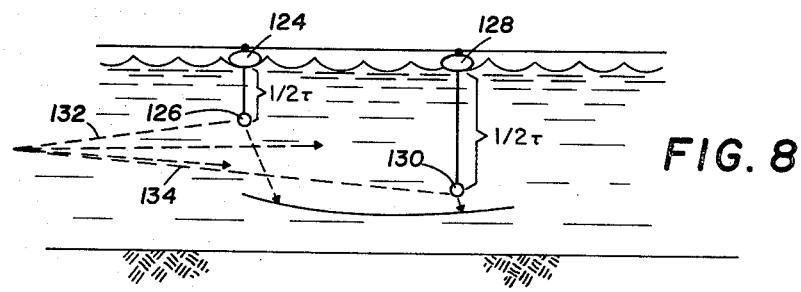
FIGURE 8 is a diagrammatic illustration wherein vertical and horizontal seismic waves are partially canceled according to the invention.

FIGURE 8 diagrammatically illustrates the use of the invention to collapse the length of a seismic wavetrain in order to enable accurate mapping of thin bed strata. A float 124 supports a seismic wave source 126 at a depth equal to one-half the wavelength of the fundamental frequency of the signal generated by the source 126. A float 128 is horizontally spaced from the float 124 and supports a source 130 at a depth equal to one-half the wavelength of the fundamental frequency of the signal emitted by the source 130. Sources 126 and 130 generate seismic waves having different fundamental frequencies, and are thus spaced at different depths.

Source 126 is actuated first to generate a seismic wavetrain which has upward, horizontal and downward components. The upwardly traveling components are reflected downward by the air-water interface and undergo a phase shift, therefore causing the reflected wavetrain to be out of phase with the later portion of the downwardly traveling component of the wavetrain. Some cancellation, or collapsing, of the later portion of the downwardly traveling wavetrain thus occurs.

The seismic wave source 130 is actuated when the front portion of the downwardly traveling wavetrain from source 126 reaches its level, and a relatively planar wave front is formed. As the source 130 is also spaced at a depth equal to one-half the wavelength of its fundamental frequency, some cancellation of the later portions of its downwardly traveling components also occurs in the manner previously described. Other multiples of one-half the wavelengths of the fundamental frequencies may also be used.

In addition to the advantages provided by the different vertical spacing of the sources, substantial cancelling of horizontally traveling wavetrain components is also provided. For instance, upon suitable firing times of sources 126 and 130, the wavetrain from source 126 traveling generally along the horizontal path 132 will be substantially out of phase at any instant at a common location with the wavetrain from source 130 traveling generally along the path 134, due to the horizontal spacing of the two sources and from the delayed firing of the sources. It will thus be seen that the invention may be used not only to adjust the shape of the downwardly traveling components of the generated seismic wavetrains, but also to afford substantial cancelling of horizontally traveling noise.

Figure 9:
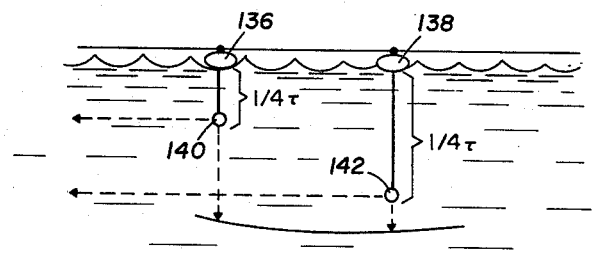
FIGURE 9 is a diagrammatic illustration of vertical spacing of seismic wave sources to provide enhancement of a downwardly traveling wave.

FIGURE 9 illustrates an embodiment for enhancement of downwardly traveling wavetrains. Floats 136 and 138 support seismic wave sources 140 and 142 at depths equal to one-fourth, or odd multiples of one-fourth, the wavelength of the fundamental frequency generated by the sources. Source 140 is actuated first and the upwardly traveling component of the wavetrain is downwardly reflected by the air-water interface and undergoes a phase change such as to make the reflected wavetrain in phase with the later portions of the downwardly traveling components of the generated wavetrain at any instant at a common location. The later portions of the downwardly traveling wave is thus reinforced. Source 142 is fired when the downwardly traveling wavetrain reaches its level, and the reflections from the water-air interface also tend to enforce the later portions of its downwardly traveling components due to the one-fourth wavelength vertical spacing of the source. The two downwardly traveling wavetrains from the two sources thus form a relatively broad downwardly traveling wave front of sufficient strength to penetrate thick formations.

In addition to the reinforcement of the downwardly traveling waves due to the vertical spacing of the sources, substantial cancelling of horizontally traveling waves is effected due to the horizontal spacing of the sources, in addition to the delayed actuation of the sources.

What is claimed is:
1. The method of marine seismic exploration comprising:
   (a) traversing a seismic exploration path with a marine vessel,
   (b) streaming behind said vessel a plurality of spaced apart seismic wave sources arranged in a geometrical configuration defining an area in a horizontal plane, ones of said sources generating seismic waves having different fundamental frequencies, and
   (c) receiving said seismic waves at points spaced behind said vessel along a length sufficiently greater than the maximum dimension of said geometrical configuration that vertically traveling components of said waves appear to emanate from a point source and horizontally traveling components of said waves tend to cancel one another due to the spacing of said sources.
2. The method of claim 1 wherein a plurality of said seismic wave sources are spaced along each of at least two paths spaced from said seismic exploration path.
3. The method of claim 1 wherein ones of said seismic waves sources are disposed at different depths in the water dependent upon the respective fundamental frequencies thereof such that vertically traveling components of said waves interact with one another.
4. The method of claim 3 wherein ones of said seismic disturbances are generated at different times so that said vertically traveling components of said disturbances interact with one another.
5. The method of claim 4 wherein said seismic wave sources are maintained at depths equal to multiples of one-fourth the wavelength of the fundamental frequency whereby vertically traveling components of said disturbances interact to form an enhanced downwardly traveling wavefront.
6. The method of claim 4 wherein said seismic wave sources are maintained at depths equal to multiples of one-half the wavelength of the generated fundamental frequency whereby vertically traveling components of said seismic disturbances tend to cancel portions of one another.
7. The method of claim 1 wherein said geometrical configuration comprises a generally V-shaped array, each side of said array being defined by a plurality of different seismic wave sources.
8. The method of claim 1 wherein said geometrical configuration comprises a generally rectangular array, each side of said array including a plurality of said seismic wave sources.
9. The method of claim 1 wherein said geometrical configuration comprises a generally circular array, the boundary of said array including a plurality of said seismic wave sources.
10. A marine seismic exploration system comprising:
    (a) a marine vessel for traversing a seismic exploration path,
    (b) an array of seismic wave sources streamed behind said vessel and spaced in a horizontal plane to define points on the boundary of a geometric area, ones of said wave sources generating seismic disturbances having different fundamental frequencies,
    (c) means to actuate said array to generate seismic disturbances, and
    (d) a plurality of receivers streamed behind said array at a distance sufficient that vertical components of said seismic disturbances appear to emanate from a point source and that horizontally traveling components of said disturbances tend to cancel one another due to the spacing of said wave sources.
11. The system of claim 10 and further comprising:
    means for spacing ones of said seismic wave sources from one another in vertical planes whereby vertical components of said seismic disturbances interact with one another.
12. The system of claim 11 wherein the vertical spacing of said sources is proportional to the fundamental frequency generated thereby.
13. The system of claim 12 wherein said seismic wave sources are maintained at depths equal to multiples of one-half the wavelength of the frequency whereby vertically traveling components of said seismic disturbances tend to cancel portions of one another.
14. The system of claim 10 and further comprising:
    float means for riding on the water surface for supporting said seismic wave sources at predetermined depths in the water,
    flexible lines connecting each of said float means, and
    means for maintaining said lines in a taut condition to position said float means to define said predetermined geometric area.
15. The system of claim 10 wherein said geometric area comprises a generally V-shape.

16. The system of claim 10 wherein said geometric area comprises a rectangle.

17. The system of claim 10 wherein said geometric area comprises a generally circular region.

References Cited

UNITED STATES PATENTS

| | | |
|---|---|---|
| 2,340,314 | 2/1944 | Farnham. |
| 2,414,480 | 1/1947 | Morrill. |
| 2,627,930 | 2/1953 | Woods. |
| 2,630,188 | 3/1953 | Hawkins et al. |
| 2,642,146 | 6/1953 | Woods. |
| 2,706,011 | 4/1955 | Bayhi. |
| 3,331,050 | 7/1967 | Kilmer et al. _____ 340—7 |
| 2,545,380 | 3/1951 | Poulter. |
| 2,693,245 | 11/1954 | Hawkins. |
| 3,386,526 | 6/1968 | Burg. |

BENJAMIN A. BORCHELT, Primary Examiner

JAMES FOX, Assistant Examiner

U.S. Cl. X.R.

340—7